United States Patent
Broelemann

(10) Patent No.: US 6,997,583 B2
(45) Date of Patent: Feb. 14, 2006

(54) LAMP FOR A VEHICLE, IN PARTICULAR READING LAMP FOR AN AIRCRAFT

(75) Inventor: Rolf Broelemann, Salzkotten (DE)

(73) Assignee: Goodrich Hella Aerospace Lighting Systems GmbH, Lippstadt (DE)

( * ) Notice: Subject to any disclaimer, the term of this patent is extended or adjusted under 35 U.S.C. 154(b) by 131 days.

(21) Appl. No.: 10/434,271

(22) Filed: May 9, 2003

(65) Prior Publication Data

US 2003/0210554 A1 Nov. 13, 2003

Related U.S. Application Data

(60) Provisional application No. 60/379,010, filed on May 10, 2002.

(30) Foreign Application Priority Data

May 10, 2002 (DE) ........................ 102 20 807

(51) Int. Cl.
*H01R 33/00* (2006.01)
*F21V 29/00* (2006.01)
*F21V 21/08* (2006.01)

(52) U.S. Cl. ........................ 362/471; 362/226; 362/294; 362/373; 362/399

(58) Field of Classification Search ................. 362/470, 362/471, 472, 490, 226, 294, 373, 374, 378, 362/396, 391, 488, 368

See application file for complete search history.

(56) References Cited

U.S. PATENT DOCUMENTS

| 1,754,658 A | 4/1930 | Uhlemann |
| 5,454,731 A | 10/1995 | Dickie |
| 5,743,617 A | 4/1998 | Sato et al. |
| 6,203,180 B1 * | 3/2001 | Fleischmann ............... 362/471 |
| 6,250,790 B1 * | 6/2001 | Montet ..................... 362/549 |
| 6,390,653 B1 * | 5/2002 | Schrewe ..................... 362/374 |

FOREIGN PATENT DOCUMENTS

| BE | 1 011 148 A6 | 5/1999 |
| DE | 42 14 016 A1 | 4/1993 |
| DE | 195 39 808 A1 | 4/1997 |
| EP | 0 388 678 A1 | 9/1990 |

* cited by examiner

*Primary Examiner*—Sandra O'Shea
*Assistant Examiner*—Guiyoung Lee
(74) *Attorney, Agent, or Firm*—Birch, Stewart, Kolasch & Birch, LLP

(57) ABSTRACT

A lamp for a vehicle includes a housing, an illuminant that is arranged in the housing, und a plug element for electrically contacting the illuminant. The lamp further includes a pull-off-assisting element for pulling the plug element off the housing in a pull-off direction. The pull-off-assisting element has a first end arranged at the plug element such that it is pivotable about a pivoting axis, which extends transversely to the pull-off direction, and a second end for being manually gripped and for facilitating pulling of the pull-off-assisting element. This pull-off-assisting element is pivotable between a parking position in which is rests against the housing, and a pull-off position in which it extends from the housing for pulling off the plug element.

17 Claims, 4 Drawing Sheets

LAMP FOR A VEHICLE, IN PARTICULAR READING LAMP FOR AN AIRCRAFT

REFERENCE TO RELATED APPLICATIONS

This application on claims benefit of the provisional application Ser. No. 60/379,010 filed May 10, 2002.

BACKGROUND OF THE INVENTION

1. Field of the Invention

The invention relates to a lamp for a vehicle, and in particular to a lamp for the interior of a vehicle, which is in particular the reading lamp for an aircraft.

2. Description of Related Art

Vehicle lamps generally comprise a housing in which an illuminant, e.g. a filament lamp or one or a plurality of LEDs are arranged. For electrically contacting the illuminant, a plug element is provided to which in most cases an electric cable is attached. Such lamps are known e.g. from DE-A-196 01 868, DE-C-195 39 808, BE-A-1011148, EP-A-0 388 678 and U.S. Pat. No. 1,754,658.

To prevent the plug element from unintentionally loosening, said element is adapted to be plugged into or pulled off the housing only after a certain minimum force has been overcome (U.S. Pat. No. 5,454,731, DE-C-42 14 016). For connecting or disconnecting the plug element, the element should thus be provided with a gripping end which can be conveniently gripped by hand and via which the necessary press and pull forces can be manually applied. A plug element of such a configuration however requires a certain amount of space and normally extends from the housing, which is problematic according to the installation situation and the confined spaces in a vehicle.

SUMMARY OF THE INVENTION

It is an object of the invention to provide a lamp for a vehicle, and in particular a reading lamp for an aircraft, which comprises an easy to handle but space-saving plug element.

According to the invention, this object is achieved with a lamp for a vehicle, and in particular a reading lamp for an aircraft, comprising:

a housing, an illuminant arranged in the housing, and a plug element for electrically contacting the illuminant, a pull-off-assisting element for pulling the plug element off the housing in a pull-off direction, wherein the pull-off-assisting element comprises a first end arranged at the plug element such that it is pivotable about a pivoting axis which extends transversely to the pull off direction, and a second end configured for being manually gripped and pulling the pull-off-assisting element, and wherein the pull-off-assisting element is pivotable between a parking position in which it rests against the housing, and a pull-off position for pulling the plug element off the housing, in which position it extends from the housing.

The lamp according to the invention comprises a pull-off-assisting element with the aid of which the plug element can be pulled off the housing in a pull-off direction. The pull-off-assisting element is arranged at the plug element such that it is pivotable transversely to the pull-off direction. At a second end the pull-off-assisting element is configured to be manually gripped and manually pulled, which feature is realized by an widened portion of the second end or an opening into which one or several fingers of a hand can be placed. The pull-off-assisting element is pivotable between a parking position and a pull-off position. In the parking position the pull-off-assisting element rests against the housing, while, in the pull-off position, it extends from the housing.

The pivotable support of the pull-off-assisting element allows said element to be space-savingly accommodated at the housing when the plug element is not to be pulled off. For pulling off the plug element, as may be required e.g. for removing or replacing the illuminant, the pull-off-assisting element is pivoted into its pull-off position in which its free end (second end) can be easily gripped by hand for applying to the pull-off-assisting element the forces required for pulling off the plug element. Thus an arrangement is created which on the one hand is a space-saving arrangement, and on the other hand allows the necessary pull-off forces to be applied to the plug element.

In an advantageous aspect of the invention it is provided that a connecting cable for the illuminant, which leads to the plug element, is arranged at the pull-off-assisting element. Thus the pull-off-assisting element is used in two ways, namely also for accommodating the connecting cable, which allows the latter to be properly laid.

In an advantageous aspect of the invention it is further provided that the pull-off-assisting element, in its parking position, is secured at the housing against unintentional movements. This can e.g. be realized with the aid of an additional holding means but also by snapping of the pull-off-assisting element into the parking position. This snapping is e.g. effected at the pivotably supported end of the pull-off-assisting element or at its other (gripping) end which, for this purpose, e.g. snaps into place behind a snapping projection or in a snapping recess at the housing.

To an increasing extent LEDs are used in particular for illumination of the aircraft interior and preferably as reading lamps. The heat produced during operation of such LEDs must be dissipated, for which purpose the housing is provided with a cooling body. The cooling body comprises a plurality of cooling ribs which are arranged e.g. in parallel to each other or in a star form. In such a configuration the pull-off-assisting element should embrace at least one of the cooling ribs such that it is secured in its parking position. In its parking position the pull-off-assisting element thus extends along the cooling body and follows the latter's shape, and then its second end grips behind at least one exposed edge or a differently configured end of a cooling rib.

The plug element is preferably arranged in a receiving recess of the housing and is supported at the housing such that it is protected against unintentional loosening and moisture. If the housing end provided with the plug element is configured in the form of a dome, it is appropriate to arrange the receiving recess within the area of the vertex of the dome. In such a housing the cooling body, which is preferably provided with cooling ribs extending in the form of a star, is arranged at the dome-shaped end of the housing on which it is placed.

A simple configuration of the pull-off-assisting element comprises a longitudinal web section whose one end is pivotably supported at the plug element and at whose opposite end a transverse web section is located which extends transversely to the longitudinal web section. Thus an essentially T-shaped structure is formed which, for the purpose of pulling off the plug element, is easy to grip e.g. by the index and the middle finger of a hand which grip the two ends of the transverse web section laterally extending from the longitudinal web section in order to apply pull forces to the pull-off-assisting element in the direction of the longitudinal web section.

Preferably, the longitudinal web section of the pull-off-assisting element is adapted to the outer contour of the housing within its area of the plug element. Thus, in its parking position, the pull-off-assisting element tightly rests against the housing. For example, the longitudinal web section is arcuate because the housing and/or the contour of the housing adjacent the plug element is of arcuate configuration.

The pull-off-assisting element is appropriately provided with a grid structure comprising individual bars along and/or between which a connecting cable can be arranged in a simple manner. Other types of accommodation of a connecting cable at the pull-off-assisting element are also feasible. For example, separate fastening elements, such as cable ties or the like, can be used. Projecting hooks at which the connecting cable can be hooked can also be employed.

BRIEF DESCRIPTION OF THE DRAWINGS

Hereunder the invention is explained in detail with reference to the drawings in which.

DETAILED DESCRIPTION OF A PREFERRED EMBODIMENT OF THE INVENTION

Hereunder the vehicle lamp according to the invention is described on the basis of an embodiment used as a lamp for the interior of a vehicle, and in particular as a lamp used as a reading lamp for an aircraft seat.

Of course, the invention is not restricted to the use in the interior of an aircraft.

Figure 1:
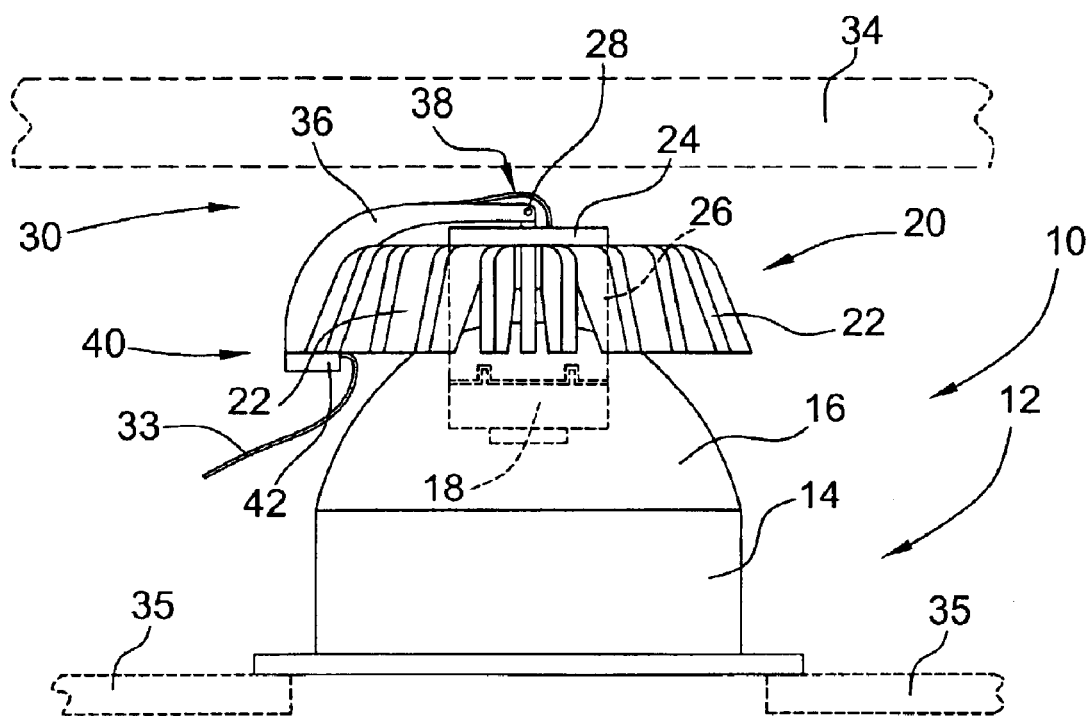
FIG. 1 shows a side view of a reading lamp for an aircraft seat with pull-off-assisting elements resting against the housing.
Figure 2:
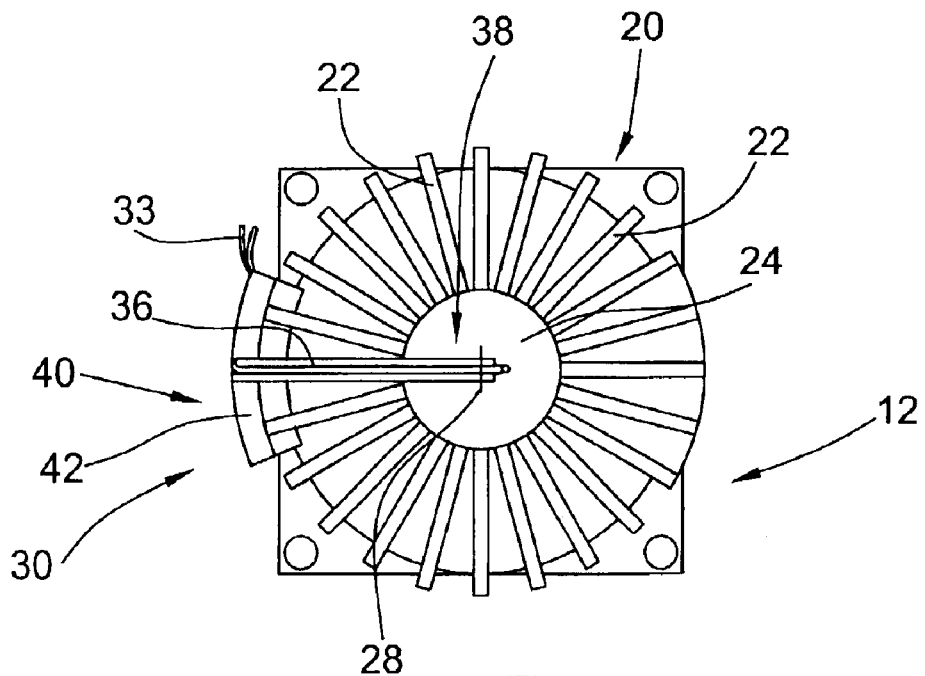
FIG. 2 shows a top view of the reading lamp shown in FIG. 1.
Figure 3:
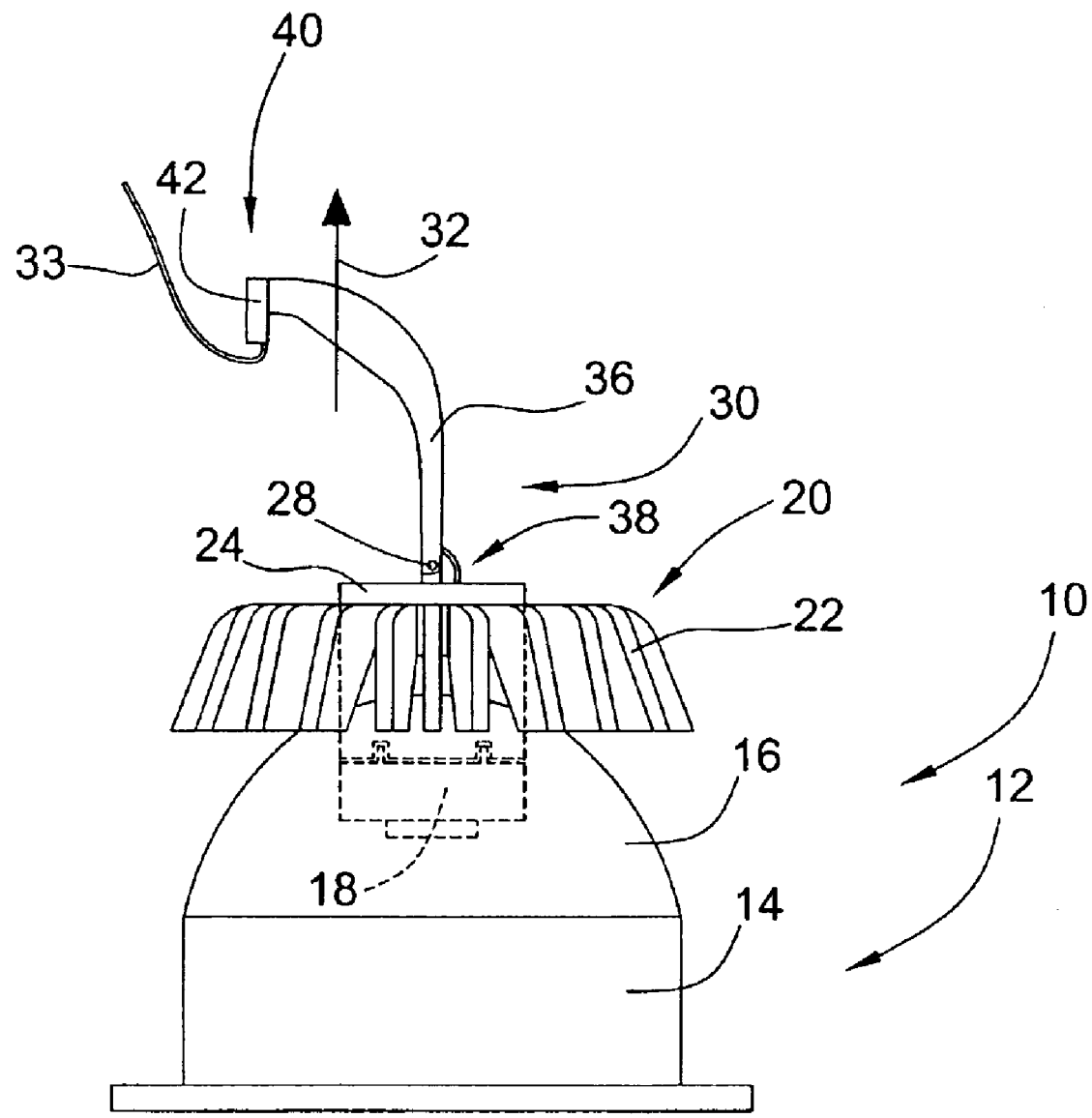
FIG. 3 shows a side view of the reading lamp with extending pull-off-assisting element.

According to FIGS. 1 to 3 the (reading) lamp 10 comprises a housing 12 provided with a cylindrical housing portion 14 and a cupola-shaped or dome-shaped housing portion 16. Other housing shapes are also possible.

In the housing 12, one or a plurality of LEDs 18 are located as illuminants which are thermally coupled with a cooling body 20 which comprises cooling ribs 22 arranged in a star form and is placed upon the dome-shaped housing portion 16.

A plug element 24 is provided for electrically contacting the LEDs, said plug element 24 being arranged in a receiving recess 26 of the cooling body 20 and/or the housing 12.

A pull-off-assisting element 30 is connected, pivotally about a pivoting axis 28, with the plug element 24, said pull-off-assisting element 30 helping the plug element 24 to be pulled off and inserted into the cooling body 20 and/or the housing 12 in the pull-off direction indicated by the arrow 32 (see FIG. 3).

The pivoting axis 28 is e.g. configured as a hollow rivet or a bolt about which the pull-off-assisting element is rotatable and which is supported at the plug element 24. A hinge connection of the pull-off-assisting element 30 and the plug element 24 other than a connection via a pivoting axis, e.g. via a living hinge, is also feasible. In all cases the hinge axis extends transversely to the pull-off direction (arrow 32). Further, the electric connecting cable 33 for the LEDs 18 is arranged at the pull-off-assisting element 30.

FIG. 1 shows the installation situation for the reading lamp 10 comprising structural and covering elements 34, 35 e.g. of the vehicle or the aircraft. The pull-off-assisting element 30 is in its hinged-down (parking) position in which it rests from outside against the cooling body 20 and thus does not affect the installation height of the reading lamp 10.

In the parking position the pull-off-assisting element 30 is securedly held at the cooling body 20. The pull-off-assisting element 30 comprises a bent longitudinal web section 36 with a grid structure, which is adapted to the contour of the cooling body 20 and whose one end 38 is pivotally supported at the plug element 24. On the opposite end 40 of the longitudinal web section 36 a transverse web section 42 is located which extends, on both sides, from the longitudinal web section 36. The transverse web section 42 also has a grid structure and, in the parking position of the pull-off-assisting element 30, grips under the ends of some of the cooling ribs 22, said ends slightly projecting relative to the housing 12 (undercut, see also FIG. 2).

For pulling off the plug element 24, the pull-off-assisting element 30 is pivoted into a pull-off position (see FIG. 3) in which the plug element 24 can be pulled out of the housing 12 and/or the cooling body 20 in the pull-off direction (arrow 32). In this connection, the pull-off-assisting element 30 is gripped at its transverse web section 42 with one finger on each side of the longitudinal web section 36 to apply a pull force to the pull-off-assisting element 30 as would be applied to a corkscrew.

Figure 4:
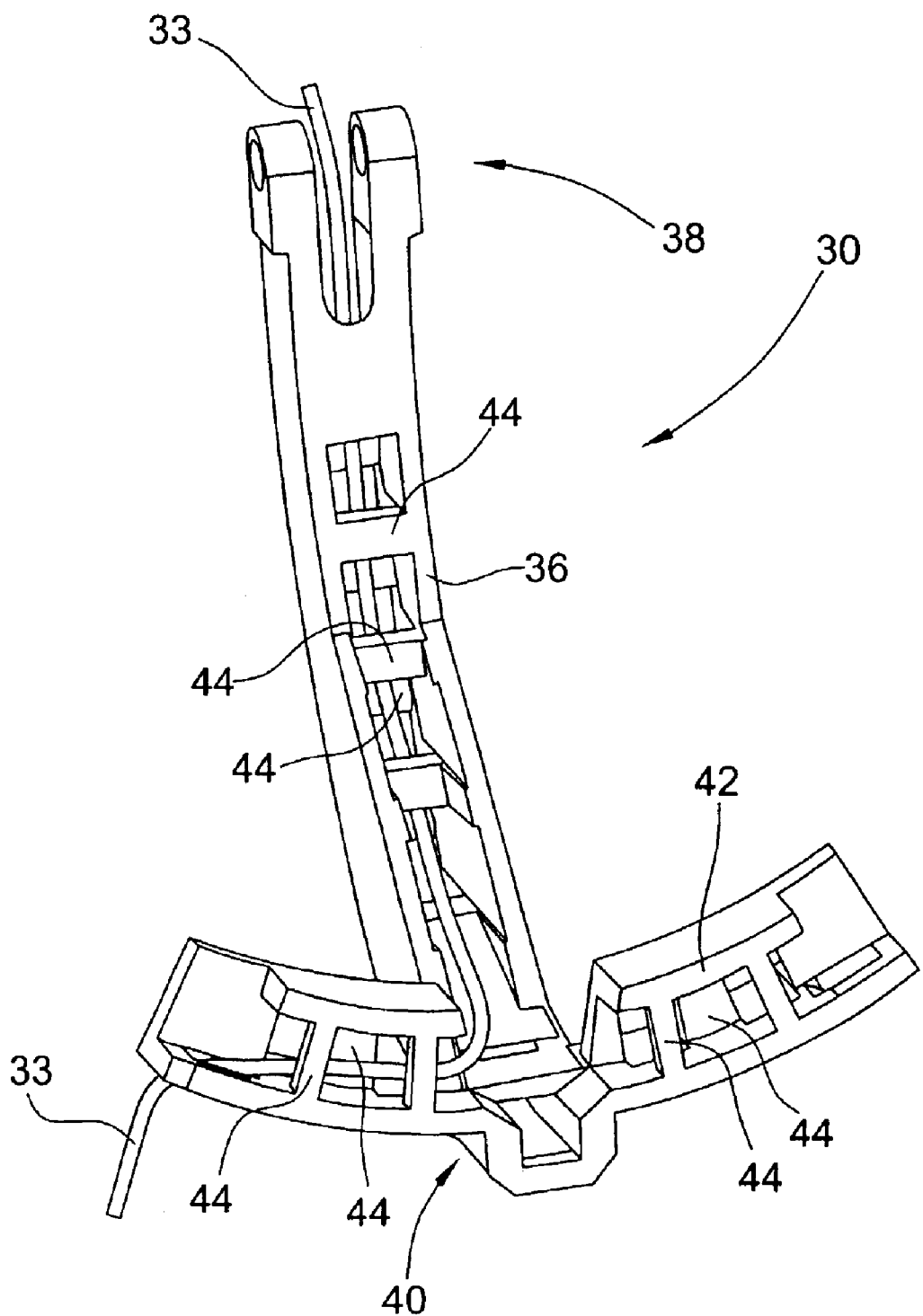
FIG. 4 shows a perspective bottom view of the pull-off-assisting element.
Figure 5:
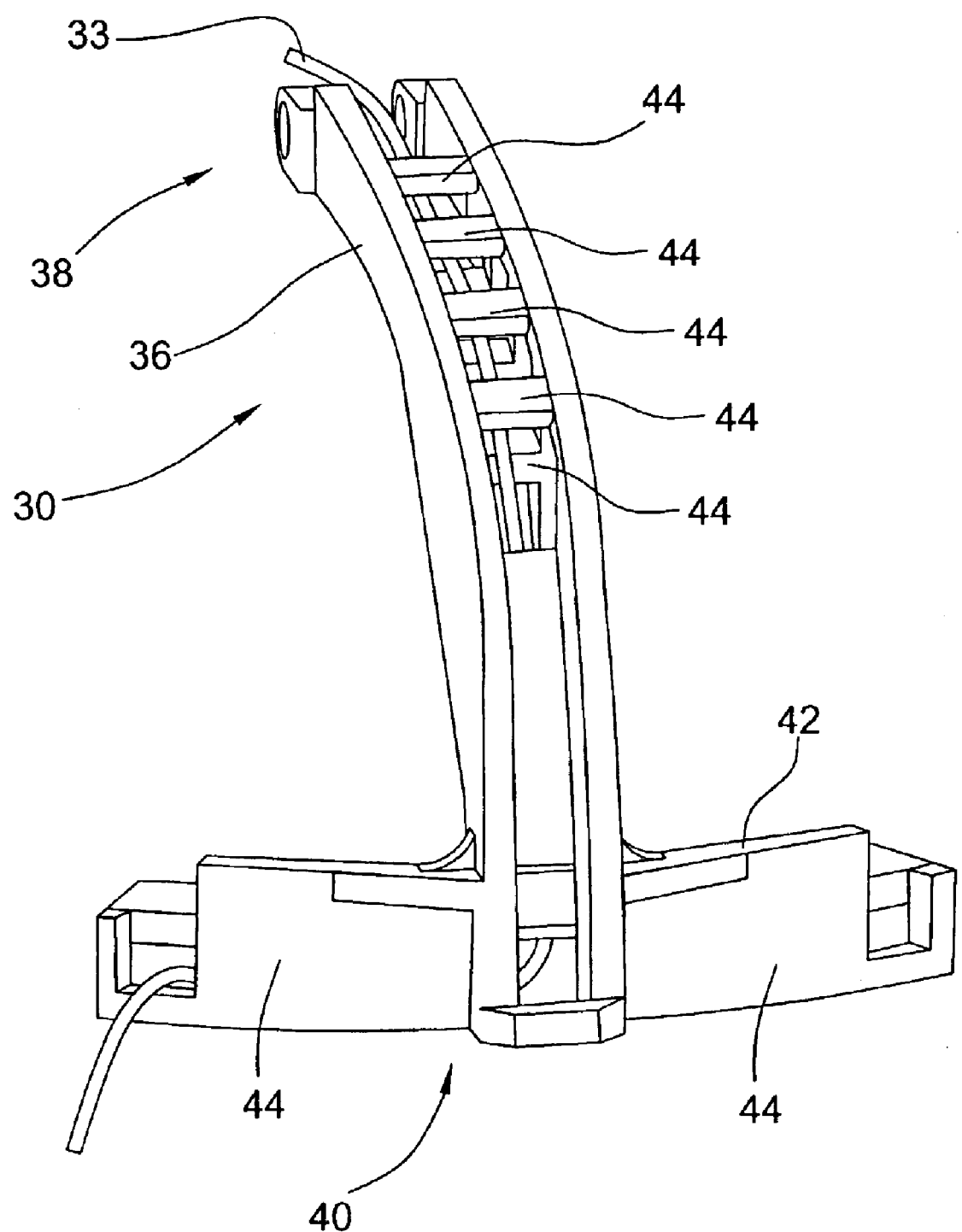
FIG. 5 shows a perspective top view of the pull-off-assisting element.

FIGS. 4 and 5 show two perspective views of the pull-off-assisting element 30. The grid structure provided with bars 44 can be seen through which passes the connecting cable 33 which leaves the pull-out element at this location. The bars impart to the pull-off-assisting element 30 a sufficient rigidity if the element is of light-weight configuration (material possibly e.g. fiber-reinforced plastic) and a sufficient flexibility such that the pull-off-assisting element 30 can snap into the parking position by embracing the ends of some of the cooling ribs 22 at the cooling body 20 and clear said snapping by releasing the embrace.

Although the invention has been described and illustrated with reference to a specific illustrative embodiment thereof, it is not intended that the invention be limited to this illustrative embodiment. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A lamp for a vehicle, comprising:

a housing;

an illuminant arranged in the housing;

a plug element for electrically contacting the illuminant; and a pull-off-assisting element for pulling the plug element off of the housing in a pull-off direction, wherein the pull-off-assisting element comprises a first end arranged at the plug element such that the first end is pivotable about a pivoting axis, which extends transversely to the pull-off direction, and a second end for being manually gripped and for facilitating pulling of the pull-off-assisting element, and wherein the pull-off-assisting element is pivotable between a parking position in which the pull-off-assisting element rests against the housing, and a pull-off position for pulling the plug element off the housing, in which position the pull-off-assisting element extends from the housing.

2. The lamp for a vehicle according to claim 1, wherein a connecting cable for the illuminant is provided, the connecting cable being arranged at the pull-off-assisting element.

3. The lamp for a vehicle according to claim 1, wherein the pull-off-assisting element, in its parking position, is secured at the housing against unintentional movements.

4. The lamp for a vehicle according to claim 1, wherein the housing comprises a receiving recess for the plug element.

5. The lamp for a vehicle according to claim 1, wherein the housing comprises a cooling body provided with cooling ribs.

6. The lamp for a vehicle according to claim 5, wherein the pull-off-assisting element, in its parking position, embraces at least one of the cooling ribs.

7. The lamp for a vehicle according to claim 1, wherein the housing comprises an end configured in the form of a dome with a vertex, and the plug element and a receiving recess for the plug element being arranged within the area of the vertex.

8. The lamp for a vehicle according to claim 5, wherein the cooling body is arranged at a dome-like end of the housing.

9. The lamp for a vehicle according to claim 1, wherein the pull-off-assisting element comprises a longitudinal web section provided with a first end and a transverse web section forming the second end, said transverse web section extending transversely to the longitudinal web section.

10. The lamp for a vehicle according to claim 9, wherein the longitudinal web section of the pull-off-assisting element is arcuate.

11. The lamp for a vehicle according to claim 9, wherein the longitudinal web and the transverse web section each comprise a grid structure provided with bars and at which a connecting cable for the illuminant is arranged.

12. The lamp for a vehicle according to claim 1, wherein the illuminant comprises at least one light emitting diode.

13. The lamp for a vehicle according to claim 1, wherein the lamp is an aircraft reading lamp.

14. The lamp for a vehicle according to claim 1, wherein the pull-off-assisting element is pivotally connected with the plug element.

15. A vehicle lamp comprising:

a housing;

a lighting device for emitting light from the housing, the lighting device having a plug element connected to an end thereof, the plug element being arranged in a receiving area of the housing; and a pull-off-assisting element having a first end pivotally connected to the plug element, wherein the pull-off-assisting element, in a first position, facilitates removal of the plug element from the housing and, in a second position, substantially follows a contour of a side of the housing.

16. The vehicle lamp according to claim 15, wherein the second position is substantially perpendicular to the first position.

17. The vehicle lamp according to claim 15, wherein the pull-off-assisting element, in the second position, secures the plug element to the housing.

* * * * *